United States Patent
Gill et al.

(10) Patent No.: US 10,362,030 B2
(45) Date of Patent: *Jul. 23, 2019

(54) METHOD AND SYSTEM FOR PROVIDING ACCESS TO ADMINISTRATIVE FUNCTIONALITY A VIRTUALIZATION ENVIRONMENT

(71) Applicant: Nutanix, Inc., San Jose, CA (US)

(72) Inventors: Binny Sher Gill, San Jose, CA (US); Karthik Chandrasekaran, Bangalore (IN); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,955

(22) Filed: Feb. 6, 2017

(65) Prior Publication Data
US 2017/0149778 A1 May 25, 2017

Related U.S. Application Data

(63) Continuation of application No. 14/556,679, filed on Dec. 1, 2014, now Pat. No. 9,565,189.

(51) Int. Cl.
*G06F 21/00* (2013.01)
*H04L 29/06* (2006.01)
*G06F 9/455* (2018.01)

(52) U.S. Cl.
CPC ...... *H04L 63/0876* (2013.01); *G06F 9/45558* (2013.01); *G06F 2009/45583* (2013.01); *G06F 2009/45587* (2013.01); *G06F 2009/45595* (2013.01)

(58) Field of Classification Search
CPC ....... H04L 63/0876; G06F 2009/45595; G06F 2009/45587; G06F 2009/45583
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,565,189 B1 * | 2/2017 | Gill ............... H04L 63/0876 |
| 9,772,866 B1 | 9/2017 | Aron et al. |
| 2011/0271279 A1 | 11/2011 | Pate |
| 2011/0296157 A1 | 12/2011 | Konetski et al. |
| 2012/0265976 A1 | 10/2012 | Spiers et al. |
| 2014/0282889 A1 | 9/2014 | Ishaya et al. |

(Continued)

OTHER PUBLICATIONS

Notice of Allowance and Fee(s) Due dated Sep. 14, 2016 for corresponding U.S. Pat. No. 9,565,189, 17 pages.

(Continued)

*Primary Examiner* — Beemnet W Dada
(74) *Attorney, Agent, or Firm* — Vista IP Law Group, LLP

(57) ABSTRACT

Described is an architecture for providing access to administrative functionality in a virtualization system using implied authentication. This approach avoids the problems associated with the requirements to use a user ID and password to access an admin console. The user ID and password can be rendered completely unnecessary, or where the user ID and password combination is only used as a supplement to the implied authentication.

21 Claims, 15 Drawing Sheets

(56) References Cited

U.S. PATENT DOCUMENTS

2016/0119291 A1    4/2016   Zollinger et al.

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication late based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

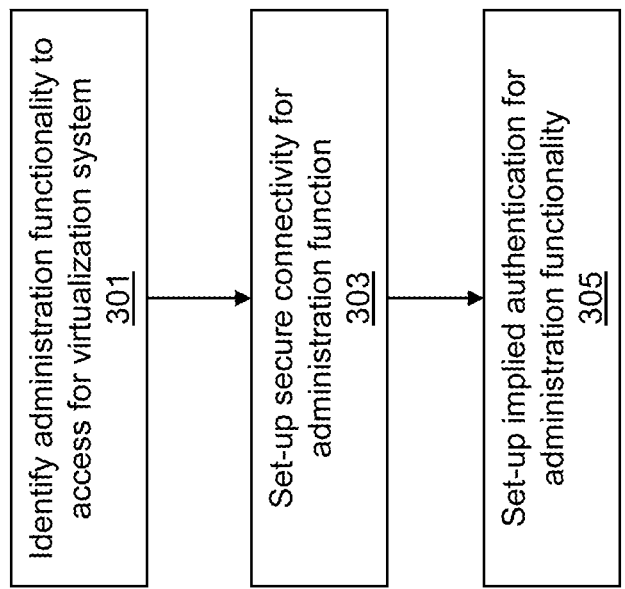

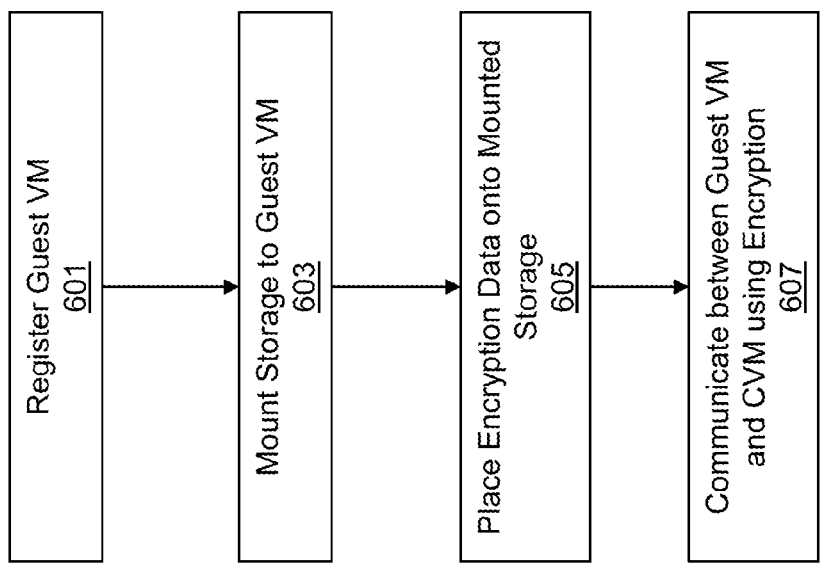

METHOD AND SYSTEM FOR PROVIDING ACCESS TO ADMINISTRATIVE FUNCTIONALITY A VIRTUALIZATION ENVIRONMENT

CROSS REFERENCE TO RELATED APPLICATION

The present application is a continuation of U.S. patent application Ser. No. 14/556,679, filed on Dec. 1, 2014, and entitled "METHOD AND SYSTEM FOR PROVIDING ACCESS TO ADMINISTRATIVE FUNCTIONALITY A VIRTUALIZATION ENVIRONMENT", which is hereby incorporated by reference in its entirety.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Many organizations implement virtualization in hosted environments, where a service provider owns and makes available the underlying infrastructure, hardware, and systems on which the customers may run one or more virtual machines. In this type of environment, there can be multiple levels of administration and administrators. For example, the service provider acts as the administrator for the underlying infrastructure, while the customer may handle administration for the virtual machines created for that customer.

The issue that often arises is that the administrator at one level of the system may need to access certain types of administrative functionality that is only available to administrators at another level of the hierarchy. For example, consider the need by many administrators to perform backup and restore functionality for various items and types of content in the system. To restore a file or file directory (e.g., because of an error, failure, or accidental deletion), the administrator of a VM running windows or unix may need to access directory backups that have been saved to disk at the hardware storage level. However, the administrator of the backups at the hardware storage level (e.g., the service provider) may be a different entity from the administrator of the VM (e.g., the customer admin).

Current solutions to this problem are generally unsatisfactory and prone to security problems. For example, one possible solution is to require the administrator of the VM to send a request to the administrator of the underlying infrastructure to perform the required restoration of the accidentally-deleted file. There are many problems with this approach, including for example, that it requires an additional delay to be incurred before the task is complete, there may be multiple levels of administrators in the chain to identify the correct person to handle the task, it relies upon the availability of the additional administrator, and errors may be introduced due to possible misunderstandings in the communications between the different levels of administrators.

Another possible solution to this problem is to provide an administrator console to perform the desired administrative functionality, where the admin console is accessible using a user ID and password provided to the customer administrator. The danger of this approach is that since it relies upon a user ID and password, any third party (even unauthorized parties) that gains access to that ID/password information is now capable to accessing the admin console. This can create very significant problems for the security and integrity of the overall system.

Therefore, there is a need for an improved approach to implement access to administrative functionality in a virtualization environment.

SUMMARY

Embodiments of the present invention provide an architecture for providing access to administrative functionality in a virtualization system using implied authentication.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3A shows a flowchart of an approach to set up the system to provide access to administrative functionality in a virtualization system.

FIG. 6 illustrates an embodiment of the invention where multiple objects can be managed using tags.

DETAILED DESCRIPTION OF THE EMBODIMENTS OF THE INVENTION

As noted above, many organizations implement virtualization in hosted environments, where a service provider owns and makes available the underlying infrastructure, hardware, and systems on which the customers may run one or more virtual machines. Since there are multiple levels of hardware/software within the environment, there may be multiple levels of administration and administrators where the service provider acts as the administrator for the underlying infrastructure while the customer handles administration for the virtual machines.

The problem is that the administrator at one level of the system may need to access certain types of administrative functionality that is only available to administrators at another level of the hierarchy. Current solutions to this problem are generally unsatisfactory and prone to security problems, where a user ID and password is provided to the customer administrator to access an admin console to perform the desired administrative functionality.

Embodiments of the present invention provide an architecture for providing access to administrative functionality in a virtualization system using implied authentication, which avoids the problems associated with the requirements to use a user ID and password to access an administration console.

Figure 1:
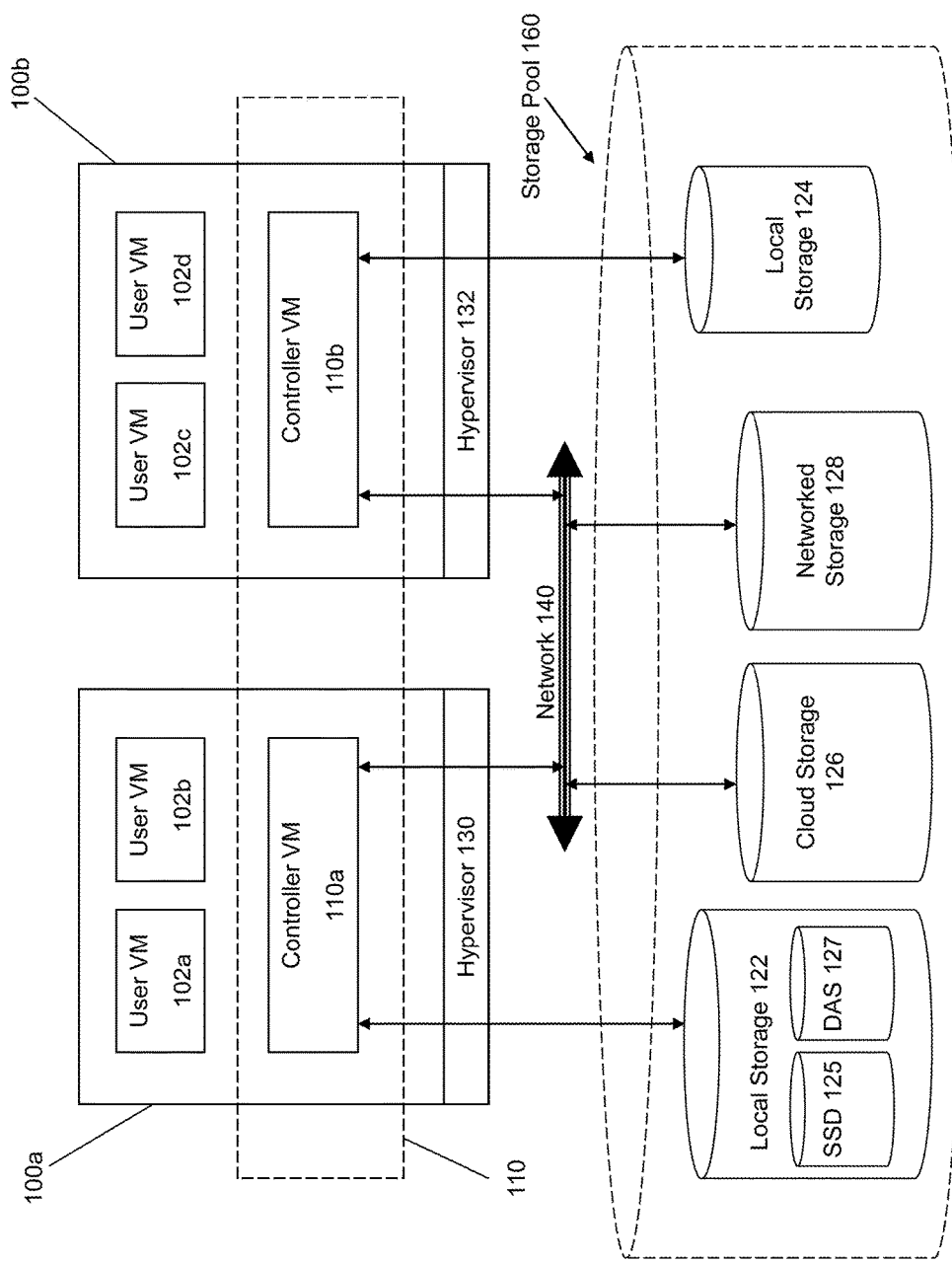
FIG. 1 illustrates an example architecture to implement I/O and storage device management in a virtualization environment according to some embodiments.

The principles described herein for the invention can be applied to any suitable virtualization environment. However, for purposes of illustration only and not by way of limitation, the present disclosure is described in the context of the example virtualization environment shown in FIG. 1, which shows an architecture for implementing storage management in a virtualization environment. The architecture of FIG. 1 can be implemented for a distributed platform that contains multiple servers 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Controller VM". This is the "Storage Controller" in the currently described architecture. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in U.S. Pat. No. 8,601,473, entitled "Architecture for Managing I/O and Storage for a Virtualization Environment", which is hereby incorporated by reference in its entirety.

As mentioned above, each node may host several user virtual machines, and virtual disks may be exposed by a node to its corresponding user virtual machines. In order to provide optimal storage management functionality to user virtual machines running within the networked virtualization environment, updates may be performed periodically at the nodes of the networked virtualization environment to ensure that the most current version of storage management functionality is available to the user virtual machines. To complete an update for a node in the networked virtualization environment, the node must be shut down or restarted for a period of time, where data residing at the node is unavailable during that portion of the update process. For the networked virtualization environment for storage management to continue operating without error, it must be ensured that data that is unavailable at a node currently undergoing an update process may be accessed at some other location within the networked virtualization environment.

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will includes its own Controller VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Controller VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 2:
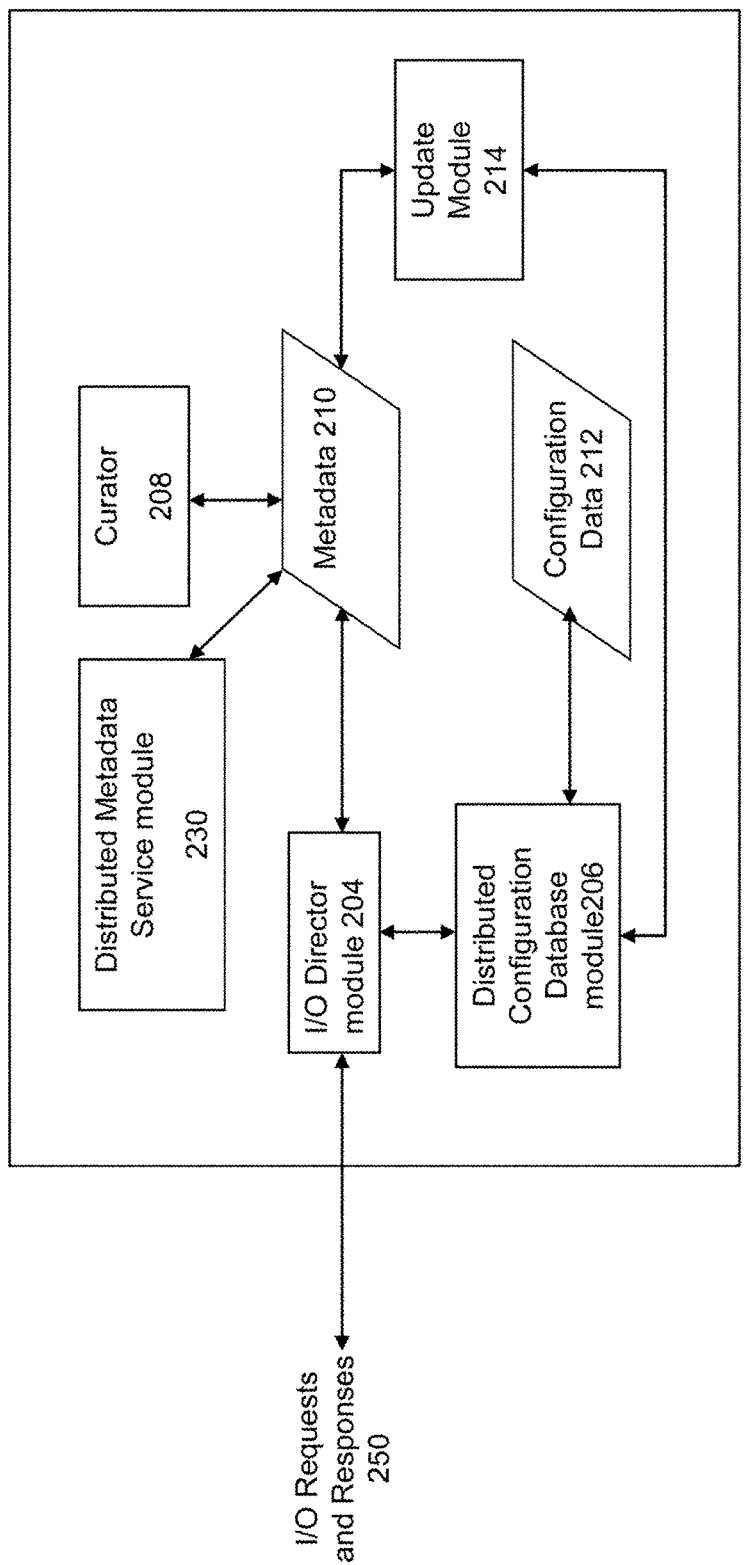
FIG. 2 illustrates the internal structures of a Controller VM according to some embodiments of the invention.

In addition to handling storage tasks for the networked virtualization environment, the Controller VMs residing at each node may also be utilized to implement the mechanism for performing rolling updates with data unavailability check. FIG. 2 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 204 (which is referred to here as the "I/O Director module 204"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the Controller VM's kernel. This write would be intercepted by the I/O Director module 204 running in user space. I/O Director module 204 interprets the iSCSI LUN or the NFS file destination and converts the request into an internal "vDisk" request (e.g., as described in more detail below). Ultimately, the I/O Director module 204 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 210 is maintained by the Controller VM to track and handle the vDisks and the data and storage objects in the system that pertain to the vDisks. The Metadata 210 is used to track and maintain the contents of the vDisks and vDisk blocks.

In order to determine where to write and read data from the storage pool, the I/O Director module 204 communicates with a Distributed Metadata Service module 230 that maintains all the metadata 210. In some embodiments, the Distributed Metadata Service module 230 is a highly available, fault-tolerant distributed service that runs on all the Controller VMs in the appliance. The metadata managed by Distributed Metadata Service module 230 is itself kept on the persistent storage attached to the appliance. According to some embodiments of the invention, the Distributed Metadata Service module 230 may be implemented on SSD storage.

Since requests to the Distributed Metadata Service module 230 may be random in nature, SSDs can be used on each server node to maintain the metadata for the Distributed Metadata Service module 230. The Distributed Metadata Service module 230 stores the metadata that helps locate the actual content of each vDisk block. If no information is found in Distributed Metadata Service module 230 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 210 are described below and in issued U.S. Pat. No. 8,850,130, which is hereby incorporated by reference in its entirety.

A health management module 208 (which may hereinafter be referred to as a "Curator") is employed to address and cure any inconsistencies that may occur with the Metadata 210. The Curator 208 oversees the overall state of the virtual storage system, and takes actions as necessary to manage the health and efficient performance of that system. According to some embodiments of the invention, the curator 208 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 208 are disclosed in U.S. Pat. No. 8,549,518, which is hereby incorporated by reference in its entirety.

Some of the Controller VMs also includes a Distributed Configuration Database module 206 to handle certain administrative tasks. The primary tasks performed by the Distributed Configuration Database module 206 are to maintain configuration data 212 for the Controller VM and act as a notification service for all events in the distributed system. Examples of configuration data 212 include, for example, (1) the identity and existence of vDisks; (2) the identity of Controller VMs in the system; (3) the physical nodes in the system; (4) the physical storage devices in the system; and (5) information pertaining to updates and updates available for the system.

For example, assume that there is a desire to add a new physical disk to the storage pool. The Distributed Configuration Database module 206 would be informed of the new physical disk, after which the configuration data 212 is updated to reflect this information so that all other entities in the system can then be made aware for the new physical disk. In a similar way, the addition/deletion of vDisks, VMs and nodes would handled by the Distributed Configuration Database module 206 to update the configuration data 212 so that other entities in the system can be made aware of these configuration changes. As another example, whenever a update is available for the system, the Distributed Configuration Database module 206 would be informed of the update, after which the configuration data 212 is updated to reflect this information so that all other entities in the system can then be made aware of the existence of the update.

Another task that is handled by the Distributed Configuration Database module 206 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 206 also handles elections and consensus management within the system. Another task handled by the Distributed Configuration Database module is to implement ID creation. Unique IDs are generated by the Distributed Configuration Database module as needed for any required objects in the system, e.g., for vDisks, Controller VMs, extent groups, etc. In some embodiments, the IDs generated are 64-bit IDs, although any suitable type of IDs can be generated as appropriate for embodiment so the invention. According to some embodiments of the invention, the Distributed Configuration Database module 206 may be implemented on an SSD storage because of the real-time guarantees required to monitor health events.

Each Controller VM may also include an update module 214 for facilitating the performance of rolling updates to the networked virtualization environment. In some embodiments, the update module 214 is a highly available, fault-tolerant distributed service that runs on all the Controller VMs in the appliance. The update module 214 may be tasked with the responsibility of notifying the system of an update, identifying the existence of a update data, performing the installation of the update data, and also performing a data unavailability check to ensure that data for the networked virtualization environment is available during the rolling update, all of which will be discussed in greater detail below.

In order to facilitate the update module 214 in performing its set of duties, the update module 214 is provided access to the metadata 210 as well as configuration data 212. As illustrated in FIG. 2, the update module 214 is provided direct access to metadata 210 and is provided indirect access to the configuration data 212 through the distributed configuration database module 206. However, it is important to note, that the update module 214 may also be provided indirect access to the metadata 210 through other modules in the controller VM (e.g., distributed metadata service module 230). Likewise, the update module 214 may be provided direct access to the configuration data 212.

Embodiments of the present invention provide an architecture for providing access to administrative functionality in a virtualization system using implied authentication, which avoids the problems associated with the requirements to use a user ID and password to access an admin console.

Figure 3B:
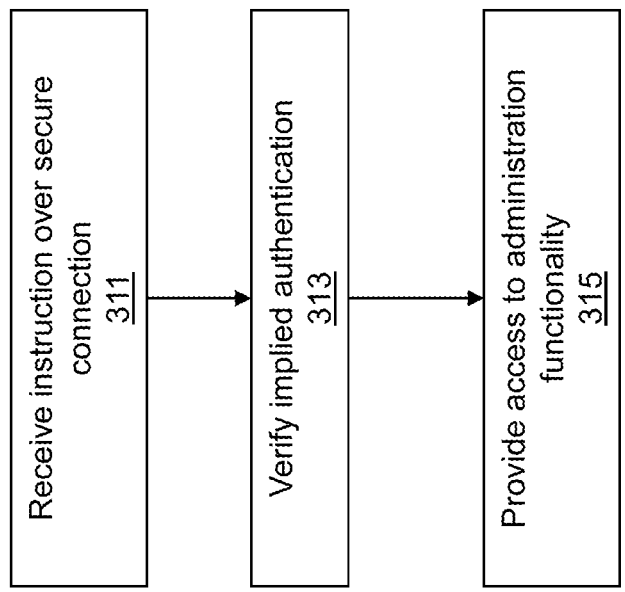
FIG. 3B shows a flowchart of an approach for a user to use the system to perform the administrative functionality.

FIGS. 3A and 3B describe an embodiment of the invention. FIG. 3A shows a flowchart of an approach to set up the system to provide access to administrative functionality in a virtualization system. FIG. 3B shows a flowchart of an approach for a user to use the system to perform the administrative functionality.

At 301 of FIG. 3A, the first action to set up the system is to identify administrative functionality that needs to be accessed in the virtualization system. Any type of administrative functionality can be managed and accessed using embodiments of the invention.

For example, many administrators need to perform tasks pertaining to backup and restore functionality for various items and types of content in the system. To restore a file or file directory (e.g., because of an error, failure, or accidental deletion), the administrator of a VM running a given operating system (e.g., windows or unix) may need to access directory backups that have been saved to disk at the hardware storage level. However, the administrator of the backups at the hardware storage level (e.g., the service provider) may be a different entity from the administrator of the VM (e.g., the customer admin). An administrative interface or console can be provided and/or identified having functionality that permits an administrator to restore the data/files from the backups. For example, a listing of files or directories may be provided for which backups have been taken and which are available for a restoration. The original backups may have been performed at a first level of administrative functionality (e.g., admin for the underlying virtualization infrastructure) that is different from the normal level of administrative functionality for the administrator that seeks to perform the restoration functionality (e.g, admin of the virtual machine that needs the restoration). The administration interface in this situation therefore permits its user to restore some item of data (e.g., file or directory) from the list of backups.

As should be clear, any and all types of administrative functionality may be implemented, accessed, and/or controlled using the present embodiment. As another example, performance and analytics functionality can be provided through an accessible administrator interface. As yet another example, system tuning and configurations functionality may also be provided using the invention.

Access to the administrative functionality is provided in some embodiments by hosting an administrative interface at the CVM, and then providing access to that interface from a VM. This permits the administrator to simply access the interface/console at the CVM (e.g., using a known address for the admin interface at the CVM), and then execute the desired functionality from that interface. Two key aspects are addressed in the invention to provide this access to the admin interface on CVM, including: (a) connectivity; and (b) authentication.

At 303, a secure connection is configured to allow access by the administrator at the VM to access the administrative functionality on the CVM. Given the fact that administrative functionality is being provided which may be dangerous if placed into the wrong hands, the general idea is that a safe and secure mechanism needs to be implemented for the connection to that functionality. One possible approach is to implement a new communications channel to provide the connectivity between the VM and the CVM. Another possible approach is to a new storage structure to provide the communications. Each of these approaches is described in more detail below.

At 305, implied authentication is provided to allow access to the administrative functionality, where the access is not based entirely on a user ID and password. Instead, the connectivity mechanism itself implicitly provides the necessary authentication, since only authorized/authenticated users have access to the connectivity mechanism. This allows the administrative access to occur without requiring usage of a user ID and password combination, or which uses the user ID and password only as a supplement to the implied authentication.

FIG. 3B shows a flowchart of an approach for a user to use the system to perform the administrative functionality. At 311, the process begins by receiving instructions over the secure connection to access the administrative functionality. This may occur, for example, by the user seeking to access an admin interface at the CVM from the VM, where the user enters the address of the management console at the CVM. The virtualization architecture will use that address to open the secure connectivity channel to the interface.

At 313, implied authentication is performed to very that the administrative functionality is permitted to the user. This may be implemented, for example, where the connectivity mechanism itself implicitly provides the necessary authentication, since only authorized/authenticated users have access to the connectivity mechanism. For example, the MAC address is checked, and connectivity access is only permitted from an authorized MAC address. As such, implied authentication is also performed since only a user from a permitted MAC address is allowed to access the administrative functionality. This allows the administrative access to occur without requiring usage of a user ID and password combination, or which uses the user ID and password only as a supplement to the implied authentication.

Thereafter, at 315, access is provided to the administrative functionality. For example, the management interface/console at the CMV is now provided to the admin user at the VM. The user at the VM operates the interface/console to perform the desired administrative functionality.

Figure 4A:
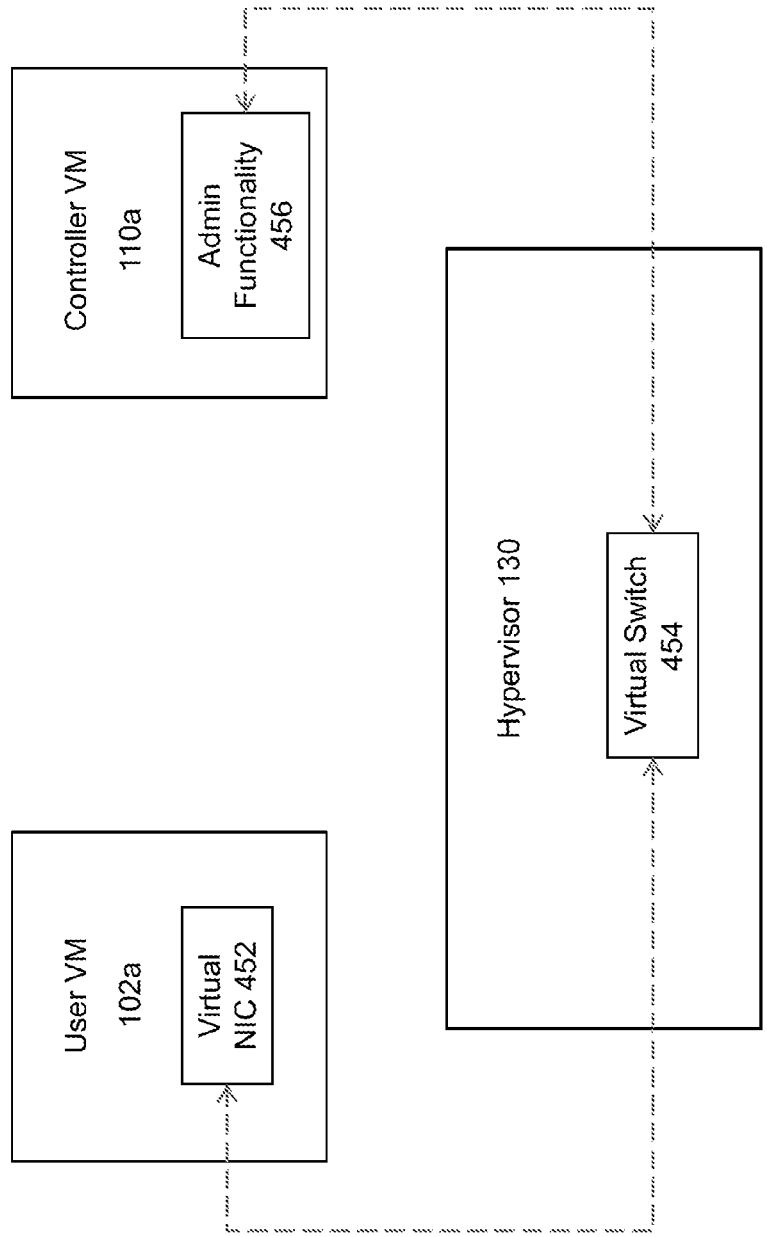
FIG. 4A illustrates one approach to implement some embodiments of the invention, where a new communications channel provides the connectivity between the VM and the CVM.

FIG. 4A illustrates one approach to implement some embodiments of the invention, where a new communications channel provides the connectivity between the VM and the CVM. Here, a virtual NIC 452 is implemented at the user VM 102*a* that corresponds to the administrative functionality 456 at the CVM 110*a*. In particular, the address for the administrative functionality 456 is correlated to the virtual NIC 452, such that any access to that address from VM 102*a* would occur through virtual NIC 452.

A virtual switch 454 is provided to send communications between the virtual NIC 452 at the user VM 102*a* and the administrative functionality 456 at the CVM 110*a*. the virtual switch 454 can be implemented at the hypervisor 130.

In operation, when the user seeks to open the address for the administrative functionality 456, the user VM 102*a* will send the request through the virtual NIC 452. The virtual NIC 452 connects to the virtual switch 454 to communicate to the administrative functionality 456.

The virtual switch 454 is configured such that only requests from an authorized MAC address are permitted to be routed to/from the administrative functionality 456. Requests from unauthorized MAC addresses are denied service from the virtual switch 454. In this way, a secure communications channel can be implemented to allow access to the administrative functionality 456. In addition, implied authentication is performed since only a user from a permitted MAC address is allowed to access the administrative functionality. This allows the administrative access to occur without requiring a user ID and password combination to be provided by the user. The user ID and password can be rendered completely unnecessary, or where the user ID and password combination is only used as a supplement to the implied authentication.

Figure 4B:
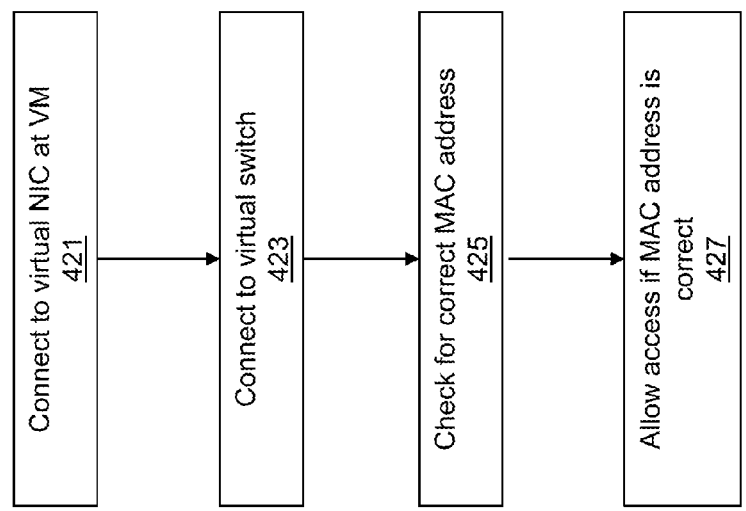
FIG. 4B shows a flowchart of an approach to implement some embodiments of the invention, where a new communications channel is used to provide the connectivity between the VM and the CVM.

FIG. 4B shows a flowchart of an approach to implement some embodiments of the invention, where a new communications channel is used to provide the connectivity between the VM and the CVM. At 421, when a user seeks to open the address for the administrative functionality, the user VM will send the request through the virtual NIC. The virtual NIC connects to the virtual switch to communicate to the administrative functionality 456. At 423, the virtual NIC connects to the virtual switch to send/receive communications from the administrative functionality at the CVM.

The virtual switch is configured such that only requests from an authorized MAC address are permitted to be routed to/from the administrative functionality. Therefore, at 425, a check is made to verify that that communications from the virtual NIC correspond to the correct MAC address. At 427, communications from the correct MAC address are permitted to be exchanged through the virtual switch with the administrative functionality at the CVM. In contrast, requests from unauthorized MAC addresses are denied service from the virtual switch.

Figure 4C:
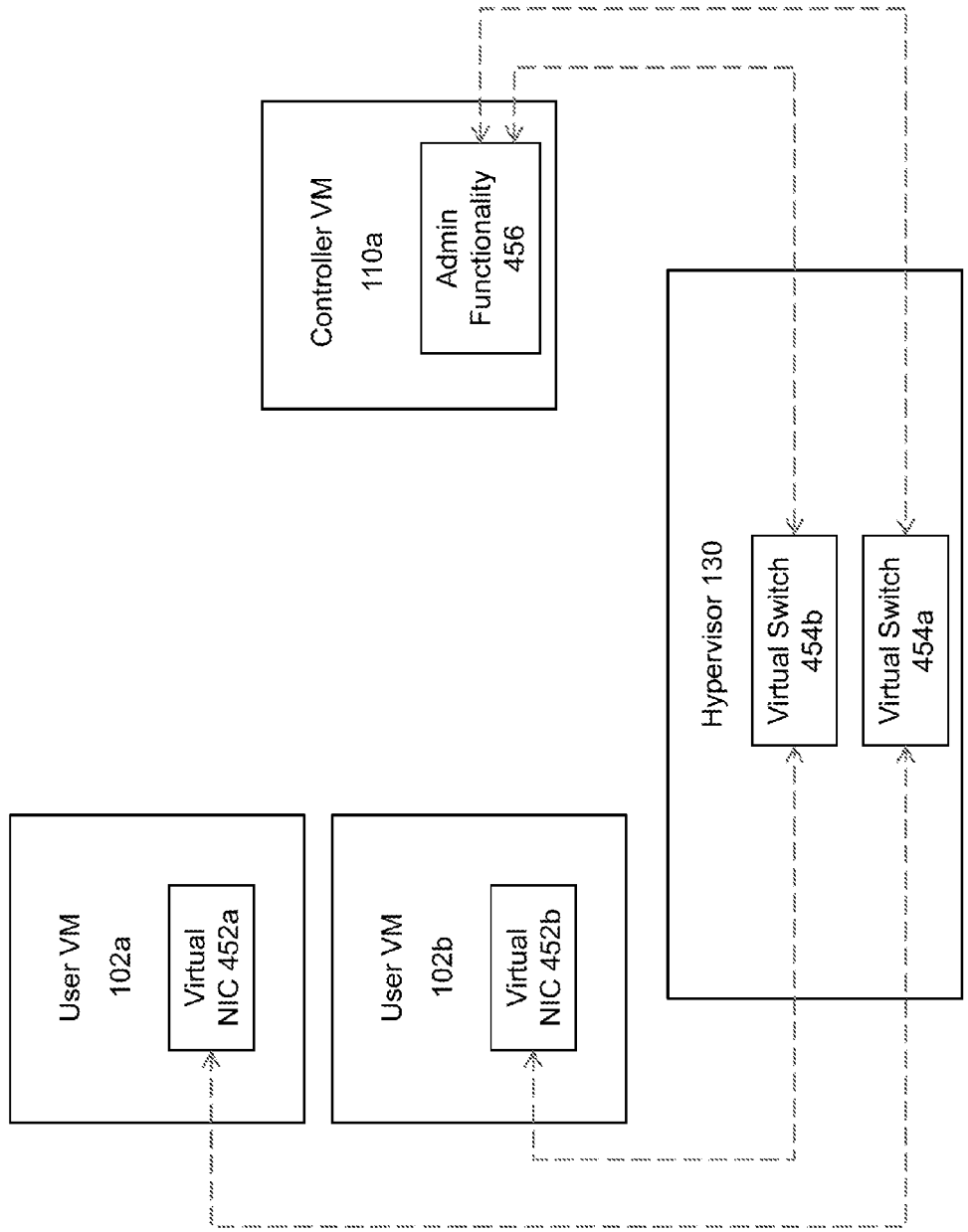
FIG. 4C illustrates an embodiment where a dedicated v-switch is provided for each virtual NIC.

FIG. 4C illustrates an embodiment where a dedicated v-switch is provided for each virtual NIC. Having the dedicated virtual switch provides an additional layer of security from unauthorized access. For example, this approach can be taken to avoid unauthorized accesses due to MAC address spoofing.

Here, virtual NIC 452a at VM 102a corresponds to its dedicated virtual switch 454a. The virtual switch 454a is configured such that it can only communicate between the MAC address of the virtual NIC 452a to the administrative functionality 456 at the CVM 110a. Therefore, any requests from other entities that have a different MAC address will not be permitted to be sent through the virtual switch 454a.

Similarly, virtual NIC 452b at VM 102b corresponds to its dedicated virtual switch 454b. The virtual switch 454b is configured such that it can only communicate between the MAC address of the virtual NIC 452b to the administrative functionality 456 at the CVM 110a. Any requests from other entities that have a different MAC address will not be permitted to be sent through the virtual switch 454b.

When a user at any of the VMs 102a or 102b seeks to access the administrative functionality 456 at the CVM 110a, communications will be sent through its respective virtual switch 454a and 454b. Any requests from other entities that have a different MAC address from what is configured for the dedicated virtual switch will not be permitted to be sent through the virtual switch. Therefore, the user at VM 102b will not be permitted to communicate from virtual NIC 452b through virtual switch 454a. Similarly, the user at VM 102a will not be permitted to communicate from virtual NIC 452a through virtual switch 454b.

Figure 4D:
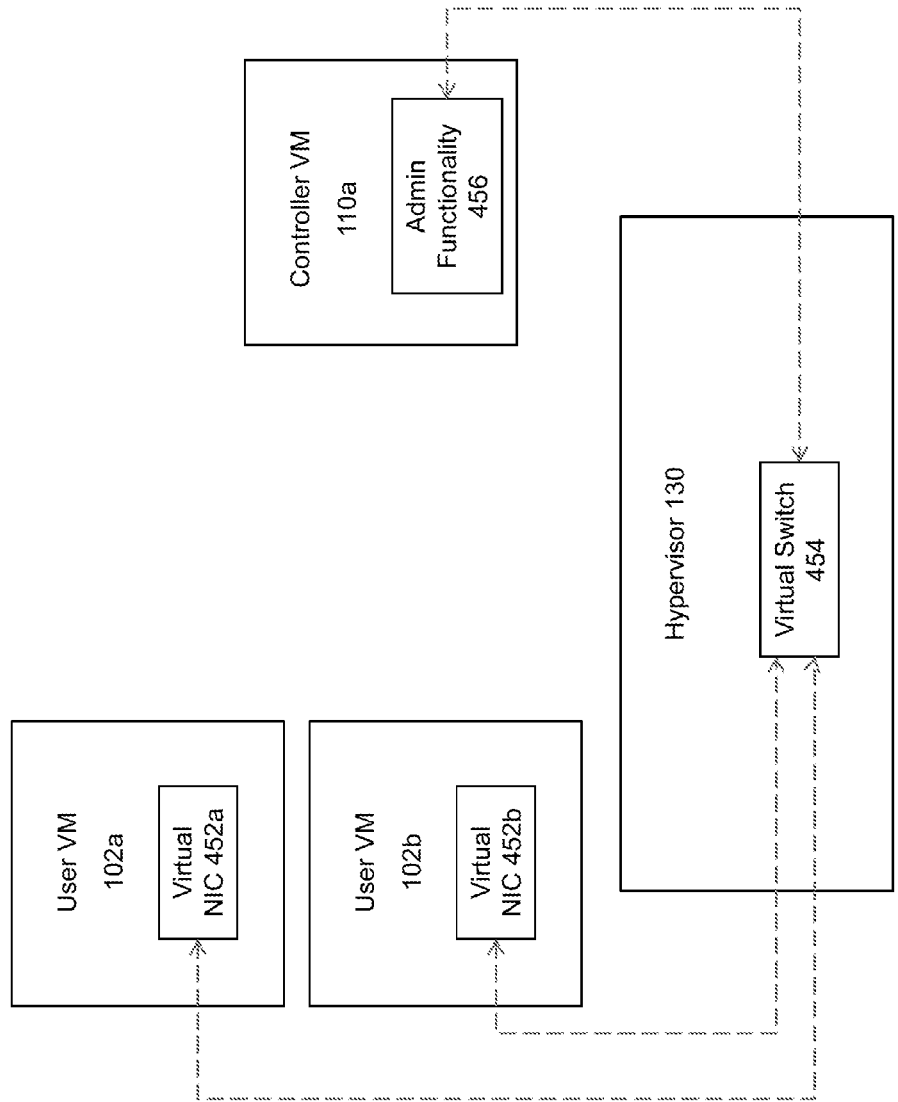
FIG. 4D illustrates an alternative embodiment, where dedicated virtual switches are not provided for the connection channels.

FIG. 4D illustrates an alternative embodiment, where dedicated virtual switches are not provided for the connection channels. Instead, a virtual switch 454 is shared among multiple virtual NICs 452a and 452b. This approach is easier from an administrative perspective to configure, since a separate virtual switch is not required to be configured for each and every virtual NIC. However, this approach is also less secure, since it is more susceptible to unauthorized accesses, e.g., due to MAC address spoofing.

Figure 5A:
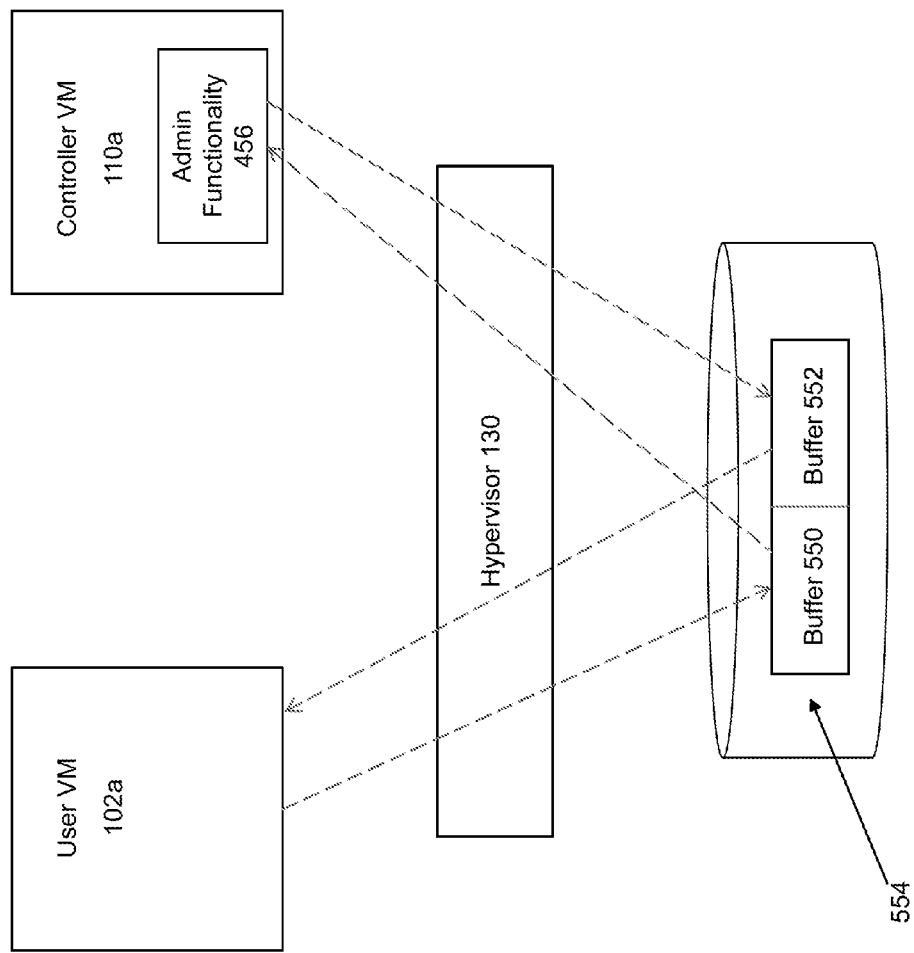
FIG. 5A illustrates another approach that can be taken to implement some embodiments of the invention, where a new storage structure to provide the communications between the VM and the CVM.

FIG. 5A illustrates another approach that can be taken to implement some embodiments of the invention, where a new storage structure to provide the communications between the VM and the CVM. Here a special vdisk 554 is provided as the communications mechanism between the VM 102a and the CVM 110a.

When the vdisk 554 is created in the system, it is configured such that only the VM 102a is permitted to read and write from that vdisk 554. No other VM is permitted to read or write from that vdisk 554. The vdisk 554 includes two different portions, where a first portion 550 comprises an out-buffer and a second portion 552 provides an in-buffer to transmit the communications between the VM 102a and the CVM 110a.

The vdisk 554 is exposed via a known interface, such as iSCSI or NFS and is mounted as a virtual disk on the user VM. In operation, when the user seeks to open the address for the administrative functionality 456 at the CVM 110a, the user VM 102a will send the request that is converted into an iSCSI command to write to the vdisk 554. The request is written to and queued in the out-buffer, where it is then retrieved by the CVM 110a. The communications from the administrative functionality is written to and queued in the in-buffer, where it is then retrieved by the VM 102a.

In this way, a secure connectivity channel is opened, since the vdisk 554 is configured such that only its corresponding VM 102a is permitted to access that vdisk 554. Implied authentication is also provided, since only the authorized VM 102a is permitted to read and write from that vdisk 554.

Figure 5B:
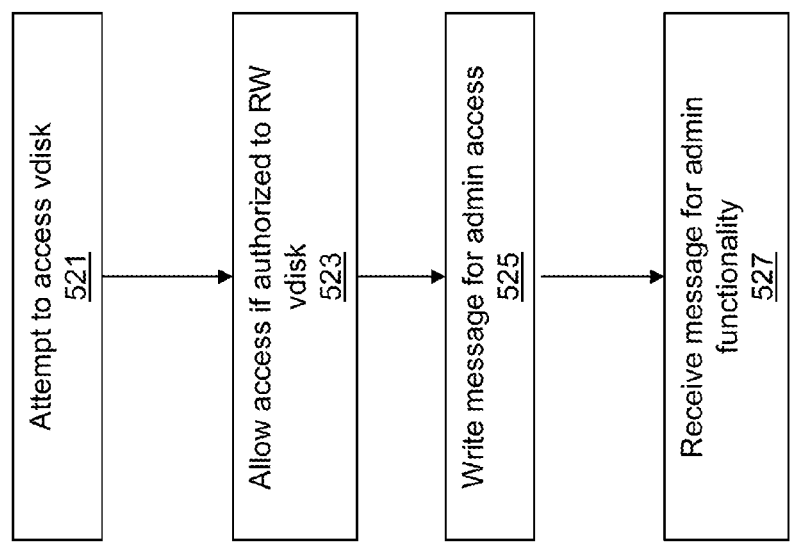
FIG. 5B shows a flowchart of an approach to implement some embodiments of the invention, where a storage-based communications channel is used to provide the connectivity between the VM and the CVM.

FIG. 5B shows a flowchart of an approach to implement some embodiments of the invention, where a storage-based communications channel is used to provide the connectivity between the VM and the CVM. At 521, when a user seeks to open the address for the administrative functionality, the user VM will send the request by attempting to write to the vdisk.

At 523, a determination is made whether the requested access is to be granted. This is performed, for example, by checking whether the VM is authorized to read/write from the vdisk. If authorized, then the user at the VM is permitted to access the vdisk. If not, then access to the vidsk is denied.

At 525, the administrative functionality is implemented by writing a message for the admin access to the vdisk. For example, when a user seeks to control an admin interface, command may be issued to operate some aspect of the interface. This command is provided as a message to be written to the appropriate queue in the vdisk.

At 527, the CVM reads the message from the queue in the vdisk. The message is then processed by the CVM to implement the desired administrative functionality. This allows the administrative access to occur without requiring a user ID and password combination to be provided by the user, since the implied authentication was implemented through the access the vdisk (which is only granted to authorized VMs and/or users).

While the above embodiments describe approaches where implied authentication is used by itself to provide administrative access from a virtual machine, it is noted that implied authentication can also be used in conjunction with other types of authentication as well. For example, the above-described implied authentication approach can be used in conjunction with a username/password combination to require multiple types of authentication processes before access is given to administrative functionality.

In some embodiments, an encryption scheme can be used in conjunction with the implied authentication approach to authentication access to the administrative functionality.

This approach can be implemented, for example, by using a private key/public key encryption scheme where a message sender uses the sender's private key to encrypt a message for the controller VM, which can only be un-encrypted by the corresponding public key for that sender. In this approach, if the message sender's message cannot be properly decrypted with the appropriate public key, then the desired administrative functionality is not implemented regardless of whether the message sender was properly validated through implied authentication.

In some embodiments, a novel approach to implement message encryption is provided that can be used in conjunction with, or as a replacement for, the above-described implied authentication approach. This embodiment pertains to a secure way to establish encryption key data that works if the storage subsystem is securely and comprehensively being managed by the storage controller.

The basis of the current approach is that the storage controller (the controller VM) establishes and/or identifies the encryption key data for the remote VM, which is provided to the VM using a mounted data storage unit. By providing the encryption key data in this manner, this provides an extremely safe approach to exchange the key data without running the risk of that data being intercepted by a third party.

FIG. 6 shows a flowchart of an approach to implement some embodiments of the invention, where a storage-based communications channel is used to exchange the encryption key data. At 601, the guest VM is registered with the system. At this time, the controller VM may establish and/or identify the appropriate encryption key data for communications between the guest VM and the controller VM. For example, the key data may include a private key and public key for the guest VM, where the guest VM uses the private key to encrypt messages to the controller VM, which can only be un-encrypted at the controller VM by the corresponding public key. Similarly, the controller VM can use the public key to encrypt messages to be sent the guest VM, which can only be un-encrypted at the guest VM by the corresponding private key.

This key data is exchanged by using a storage-based communications channel. For example, at 603, a storage partition can be mounted to the guest VM to serve as the secure storage-based communications channel. At 605, the encryption key data can then be placed onto the mounted storage. For example, the guest VM's private and/or public key can be exchanged between the guest VM and the controller VM by placing that data onto the mounted storage unit.

Thereafter, at 607, connectivity between the VM and the CVM can be established with encryption using the key data that was placed onto the mounted storage unit. For example, when a user seeks to access administrative functionality, the user VM will send the request by writing a message using the private encryption key. A determination is made at the controller VM whether the requested access is to be granted. This is performed, for example, by checking whether the message from the guest VM was encrypted with the appropriate key, e.g., by attempting to decrypt that message with the corresponding public key. If authorized, then the user at the VM is permitted to access the administrative functionality. As just one example, when a user seeks to control an admin interface, command may be issued to operate some aspect of the interface. This command is provided as an encrypted message to be exchanged using an encryption key from the mounted partition.

Figure 7A:
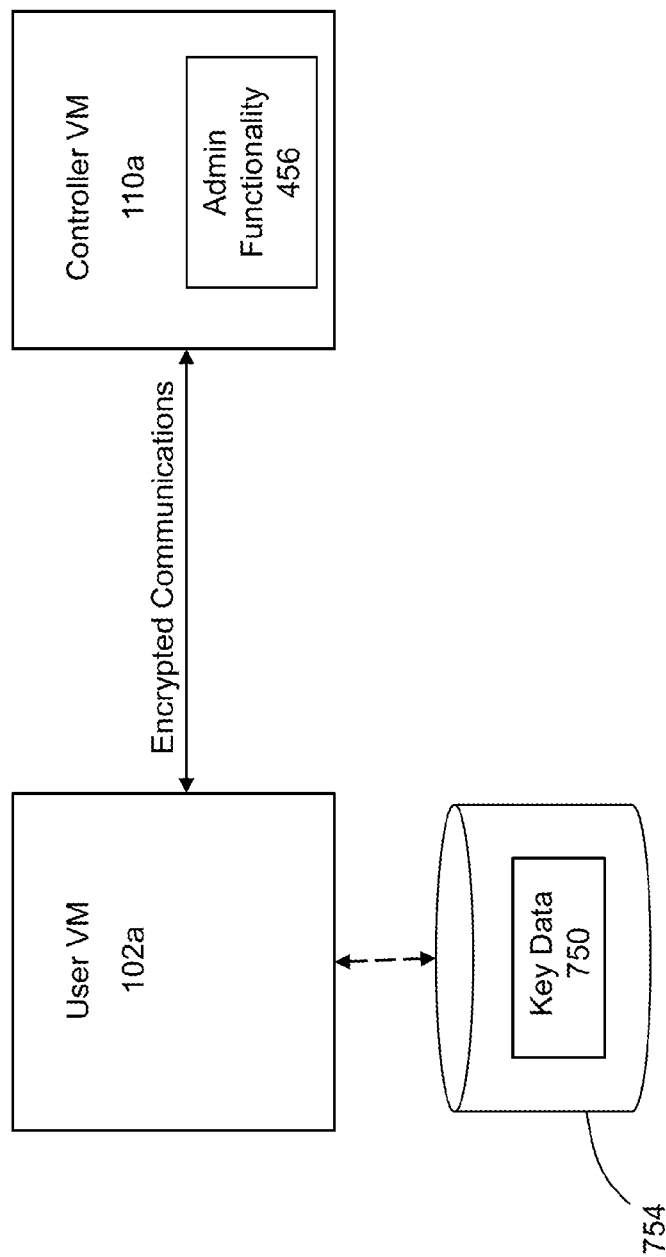
FIGS. 7A-C illustrate various embodiments of the invention.

FIG. 7A illustrates this approach of the invention where a storage-based communications channel is used to exchange the key data between the VM and the CVM. Here, a partition 754 is mounted to the user VM 102a. The mounted unit 754 (e.g., mounted disk) includes key data 750, e.g., containing information pertaining to a private key/public key pair. The user VM 102a accesses administrative functionality 456 by exchanging encrypted communications with the controller VM 110a. The user VM 102a is only granted access to the administrative functionality 456 if the communications is properly encrypted with the key data 750.

Figure 7B:
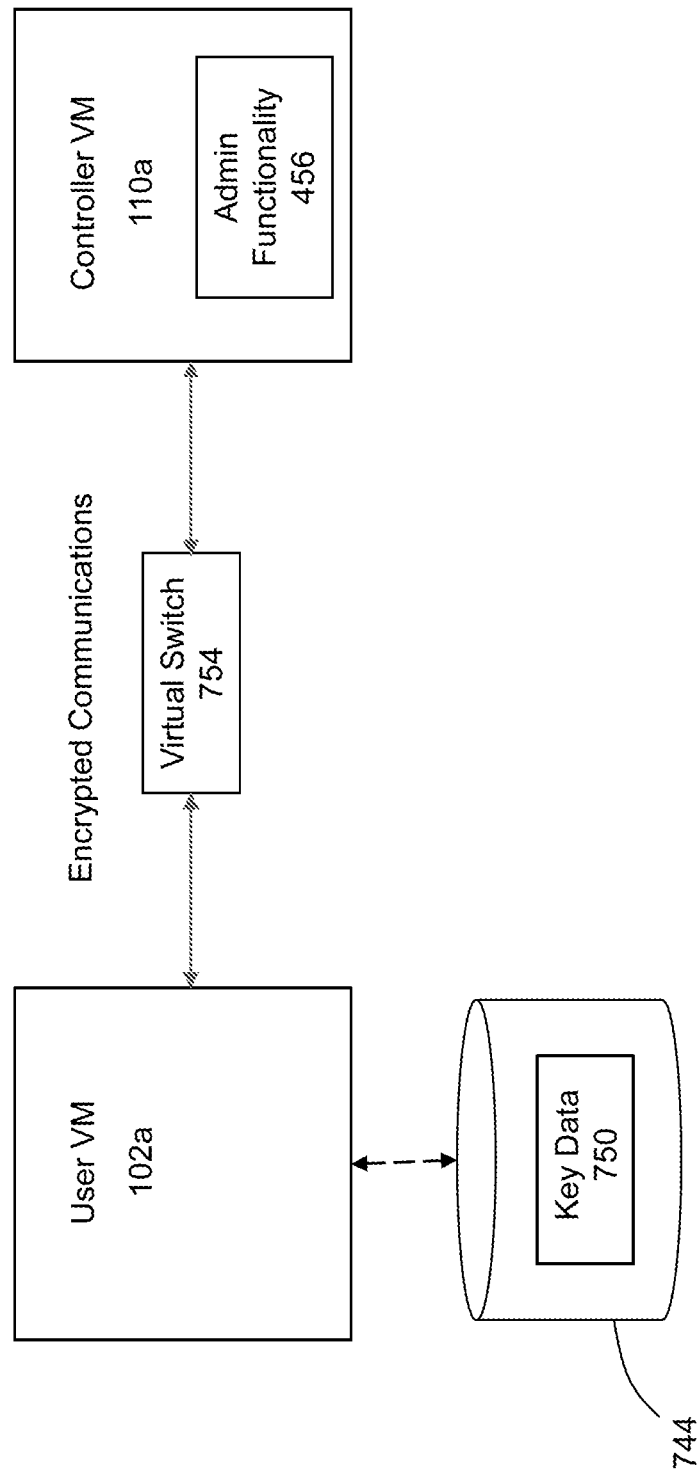

It is noted that this approach with regards to the secure storage-related way to the exchange key encryption key data can be used in conjunction with the above-described implied authentication approaches. For example, as shown in FIG. 7B, the encrypted communications can be used in conjunction with implied authentication implemented using the virtual switch 754. Here, a virtual NIC is implemented at the user VM 102a that corresponds to the administrative functionality 456 at the CVM 110a. In particular, the address for the administrative functionality 456 is correlated to the virtual NIC 452, such that any access to that address from VM 102a would occur through virtual NIC 452. The virtual switch 454 is provided to send communications between the virtual NIC 452 at the user VM 102a and the administrative functionality 456 at the CVM 110a. In operation, when the user seeks to open the address for the administrative functionality 456, the user VM 102a will send the request through the virtual NIC 452 at the user VM 102a. The virtual NIC 452 connects to the virtual switch 454 to communicate to the administrative functionality 456.

The virtual switch 454 is configured such that only requests from an authorized MAC address are permitted to be routed to/from the administrative functionality 456. Requests from unauthorized MAC addresses are denied service from the virtual switch 454. In this way, a secure communications channel can be implemented to allow access to the administrative functionality 456. Moreover, the communications between the user VM 102a and the controller VM 110a are encrypted using the key data 750 that was placed onto the mounted unit 744. Any communications that are not properly encrypted can be denied.

In this way, implied authentication is performed since only a user from a permitted MAC address is allowed to access the administrative functionality. Further security is provided since only communications properly encrypted with the key data from the privately mounted unit 744 are permitted to access the administrative functionality.

Figure 7C:
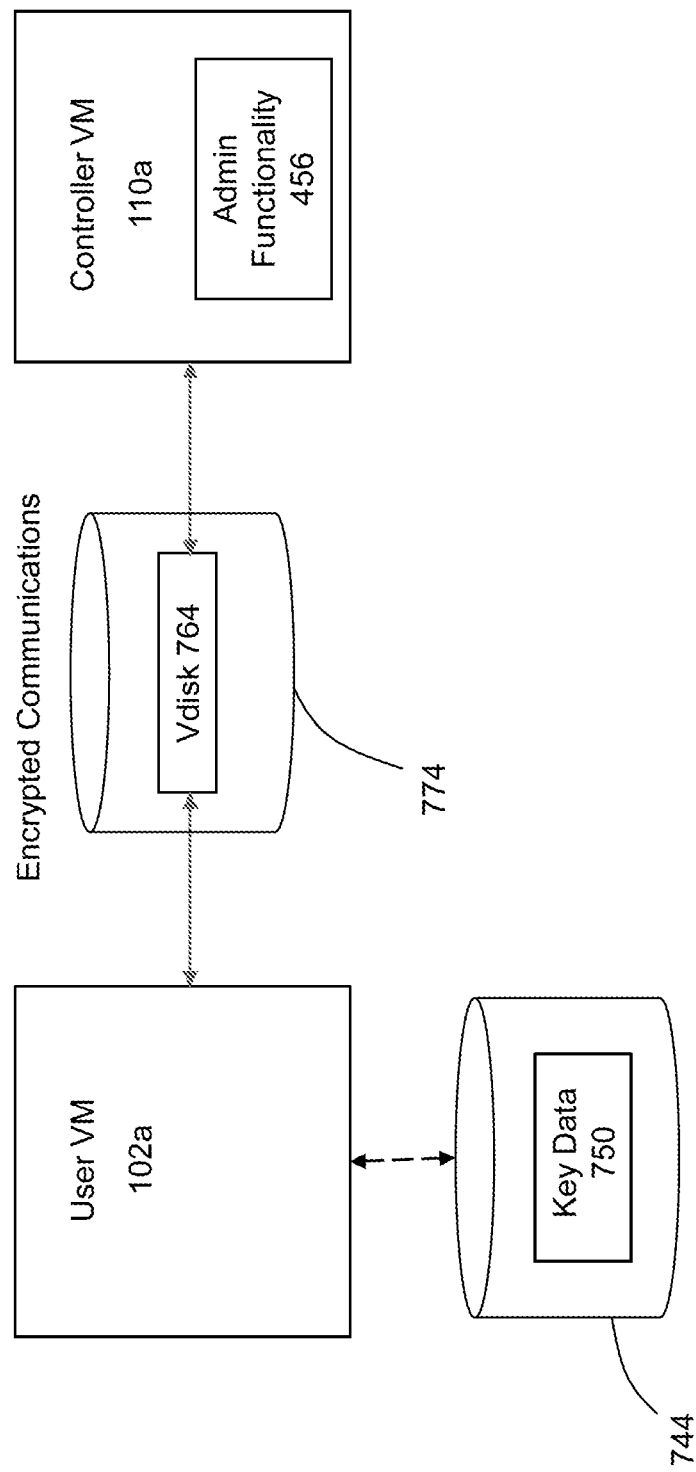

FIG. 7C illustrates another approach that can be taken, where the secure storage-related way to the exchange key encryption key data is used in conjunction the storage-related implied authentication approach. Here, where a storage structure is provided for the communications between the VM and the CVM, where a special vdisk 764 is provided as the communications mechanism between the VM 102a and the CVM 110a. When the vdisk 764 is created in the system, it is configured such that only the VM 102a is permitted to read and write from that vdisk 764. No other VM is permitted to read or write from that vdisk 764. The vdisk 764 is exposed via a known interface, such as iSCSI or NFS and is mounted as a virtual disk on the user VM. In operation, when the user seeks to open the address for the administrative functionality 456 at the CVM 110a, the user VM 102a will send the request that is converted into an iSCSI command to write to the vdisk 764. The request is written to and queued in the out-buffer, where it is then retrieved by the CVM 110a. The communications from the administrative functionality is written to and queued in the in-buffer, where it is then retrieved by the VM 102*a*.

In addition, the communications between the user VM 102*a* and the controller VM 110*a* are encrypted using the key data 750 that was placed onto the mounted unit 744. Any communications that are not properly encrypted can be denied. In this way, a secure connectivity channel is opened, since the vdisk 764 is configured such that only its corresponding VM 102*a* is permitted to access that vdisk 764 and access permitted only if the proper encryption is used. Implied authentication is provided, since only the authorized VM 102*a* is permitted to read and write from that vdisk 764, and only if encryption was implemented using the key data 750.

The present embodiments can also be used to perform identification functionality. The implied authentication mechanisms described herein permit secure and implied identification of given node/VM, e.g., through the storage based communications mechanisms such as MAC addresses, key data, and ability to write to private data objects. For example, a secure communications channel can be used to perform the identification, where the communications channel includes a virtual NIC, and the identification is implemented by determining if a correct MAC address is present to communicate over the secure communications channel. As another example, the secure communications channel may comprise a virtual disk having one or more buffers to communicate between the virtual machine and the administrative functionality, and the identification is implemented by determining whether an authorized entity is present to access the virtual disk.

It is noted that the present embodiments are applicable to provide implied authentication for any type of access at a remote site, and is not limited only to access for administrative functionality. The interface and/or other object/component to be accessed can be configured to perform any suitable function or include any suitably accessible data item.

According to some embodiments of the invention, multiple objects can be managed using the present invention using tags. Each virtual machine may be associated with a tag that groups that virtual machine with other virtual machines for a specific management category.

For example, the virtual machines may be grouped on the basis of having the same set of administrative management requirements, e.g., all having a common set of functionality, system, or software. In this case, a first set of virtual machines/objects may all be associated with the same first tag. Similarly, a second set of virtual machines/objects may all be associated with its own second tag.

When direct access is desired for administrative functionality for one virtual machine/object (within the first group where all share the same first tag), access can be provided for other virtual machines/objects in that same group. This is because since the VMs in that same group share the same tag, direct administrative access can therefore be provided that also allow access for administrative purposes to the other VMs having that same tag.

Therefore, what has been described is an improved approach for providing access to administrative functionality in a virtualization system using implied authentication, which avoids the problems associated with the requirements to use a user ID and password to access an admin console. The user ID and password can be rendered completely unnecessary, or where the user ID and password combination is only used as a supplement to the implied authentication.

System Architecture

Figure 8:
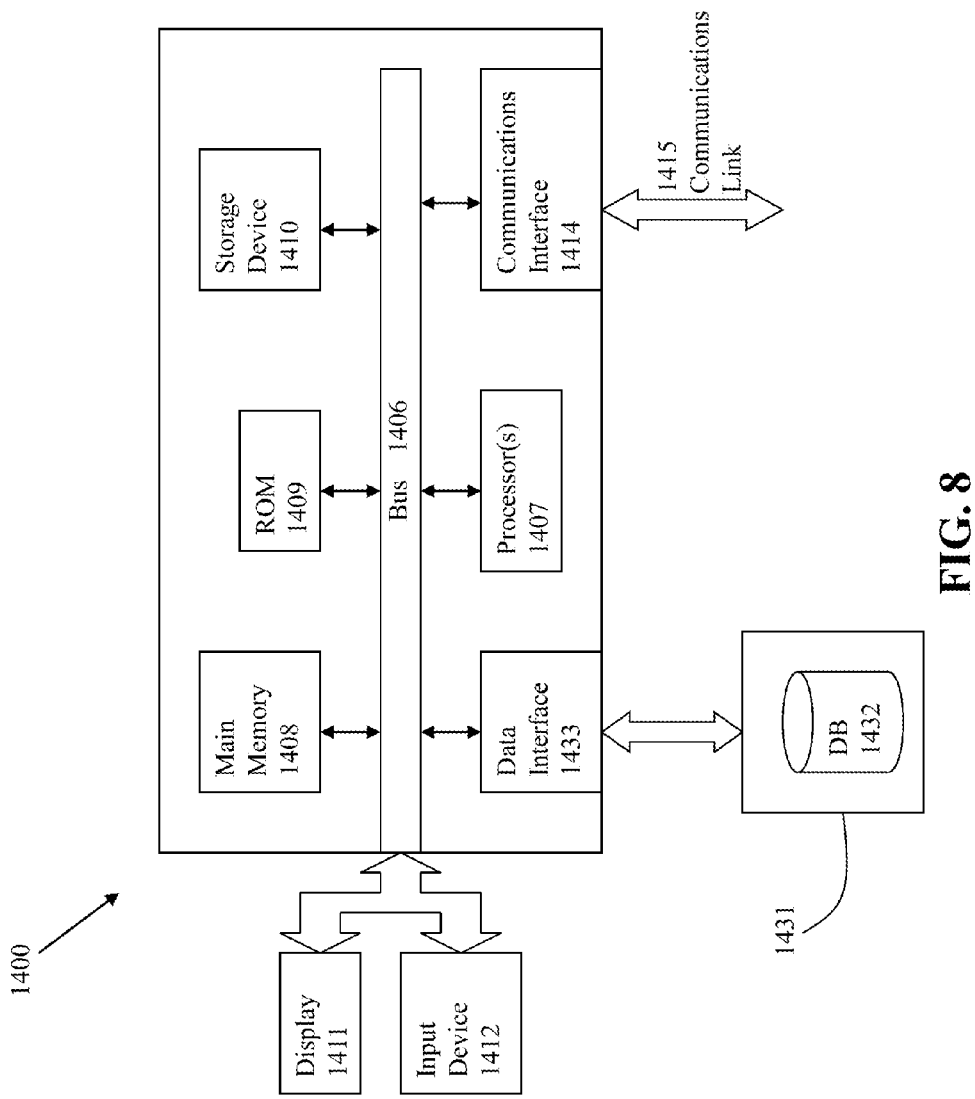
FIG. 8 illustrates a block diagram of a computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. A database 1432 may be provided on medium 1431.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for providing access to administrative functionality in a virtualization environment, comprising:
    identifying an administrative functionality to access;
    communicating from a user virtual machine over a secure communications channel to access the administrative functionality, wherein implied authentication corresponding to communications mechanisms in an underlying virtualization infrastructure is used to authenticate access to the administrative functionality from the user virtual machine;
    configuring a virtual disk that only permits a particular user virtual machine to read from and write to the virtual disk, wherein the user virtual machine corresponds to the particular user virtual machine that is associated with the virtual disk; and
    implementing the implied authentication by only permitting the user virtual machine that corresponds to the particular user virtual machine to communicate with the virtual disk.

2. The computer-implemented method of claim 1, wherein the virtual disk comprises an out-buffer portion and an in-buffer portion, and the out-buffer portion and the in-buffer portion transmitting communications between the user virtual machine and the administrative functionality.

3. The computer-implemented method of claim 2, wherein a communication from the user virtual machine is written to and queued in the out-buffer portion of the virtual disk, and the communication is then retrieved from the out-buffer portion by the particular virtual machine.

4. The computer-implemented method of claim 2, wherein a communication of the communications issued from the administrative functionality is written to and queued in the in-buffer portion of the virtual disk, and the communication is then retrieved by the user virtual machine.

5. The computer-implemented method of claim 3, further comprising implementing, by the particular virtual machine, a desired administrative functionality, wherein access to the desired administrative functionality occurs without requiring a user ID and a password combination from the user virtual machine.

6. The computer-implemented method of claim 1, wherein the user virtual machine seeks to open an address for the administrative functionality by sending a communication request attempting to write to the virtual disk.

7. The computer-implemented method of claim 1, wherein the user virtual machine communicates to the particular virtual machine to access the administrative functionality.

8. A system, comprising:
    a computer processor to execute a set of program instructions; and
    a memory to hold the set of program instructions, in which the set of program instructions comprises program code to perform:
        identifying an administrative functionality to access;
        communicating from a user virtual machine over a secure communication channel to access the administrative functionality, wherein implied authentication corresponding to a communication mechanism in an underlying virtualization infrastructure is used to authenticate access to the administrative functionality from the user virtual machine;
        configuring a virtual disk that only permits a particular virtual machine to read from and write to the virtual disk, wherein the user virtual machine corresponds to the particular virtual machine that is associated with the virtual disk; and
        implementing the implied authentication by only permitting the user virtual machine that corresponds to the particular virtual machine to communicate with the virtual disk.

9. The system of claim 8, wherein the virtual disk comprises an out-buffer portion and an in-buffer portion, and the out-buffer portion and the in-buffer portion transmitting communications between the user virtual machine and the administrative functionality.

10. The system of claim 9, wherein a communication from the user virtual machine is written to and queued in the out-buffer portion of the virtual disk, and the communication is then retrieved from the out-buffer portion by a controller virtual machine.

11. The system of claim 9, wherein a communication issued from the administrative functionality is written to and queued in the in-buffer portion of the virtual disk, and the communication is then retrieved by the user virtual machine.

12. The system of claim 10, in which the set of program instructions comprises program code to further perform:
    implementing, by the particular virtual machine, a desired administrative functionality, wherein access to the desired administrative functionality occurs without requiring a user ID and a password combination from the user virtual machine.

13. The system of claim 8, wherein the user virtual machine seeks to open an address for the administrative functionality by sending a communication request attempting to write to the virtual disk.

14. The system of claim 8, wherein the user virtual machine communicates to the particular virtual machine to access the administrative functionality.

15. A computer program product embodied in a non-transitory computer readable medium, the computer readable medium having stored thereon a sequence of instructions which, when executed by a processor causes the processor to execute a set of acts, the process comprising:
    identifying an administrative functionality to access;
    communicating from a user virtual machine over a secure communication channel to access the administrative functionality, wherein implied authentication corresponding to a communication mechanism in an underlying virtualization infrastructure is used to authenticate access to the administrative functionality from the user virtual machine; and
    configuring a virtual disk that only permits a particular virtual machine to read from and write to the virtual disk, wherein the user virtual machine corresponds to the particular virtual machine that is associated with the virtual disk; and
    implementing the implied authentication by only permitting the user virtual machine that corresponds to the particular virtual machine to communicate with the virtual disk.

16. The computer program product of claim 15, wherein the virtual disk comprises an out-buffer portion and an in-buffer portion, and the out-buffer portion and the in-buffer portion transmitting communications between the user virtual machine and the administrative functionality.

17. The computer program product of claim 16, wherein a communication from the user virtual machine is written to and queued in the out-buffer portion of the virtual disk, and the communication is then retrieved from the out-buffer portion by the particular virtual machine.

18. The computer program product of claim 16, wherein a communication issued from the administrative functionality is written to and queued in the in-buffer portion of the virtual disk, and the communication is then retrieved by the user virtual machine.

19. The computer program product of claim 17, wherein the set of facts further comprising:
   implementing, by the particular virtual machine, a desired administrative functionality, wherein access to the desired administrative functionality occurs without requiring a user ID and a password combination from the user virtual machine.

20. The computer program product of claim 15, wherein the user virtual machine seeks to open an address for the administrative functionality by sending a communication request attempting to write to the virtual disk.

21. The computer program product of claim 15, wherein the user virtual machine communicates to the particular virtual machine to access the administrative functionality.

* * * * *